United States Patent
Eral et al.

(10) Patent No.: US 10,661,306 B2
(45) Date of Patent: May 26, 2020

(54) METHOD FOR TREATING A DROP OF LIQUID

(75) Inventors: Huseyin Burak Eral, Enschede (NL); Mampallil Augustine Dileep, Enschede (NL); Frieder Mugele, Enschede (NL)

(73) Assignee: Universiteit Twente, Enschede (NL)

( * ) Notice: Subject to any disclaimer, the term of this patent is extended or adjusted under 35 U.S.C. 154(b) by 1000 days.

(21) Appl. No.: 13/697,870

(22) PCT Filed: May 16, 2011

(86) PCT No.: PCT/NL2011/050328
§ 371 (c)(1),
(2), (4) Date: Jan. 4, 2013

(87) PCT Pub. No.: WO2011/145929
PCT Pub. Date: Nov. 24, 2011

(65) Prior Publication Data
US 2013/0101753 A1    Apr. 25, 2013

(30) Foreign Application Priority Data

May 17, 2010 (EP) .................................. 10163000

(51) Int. Cl.
*B05D 3/14* (2006.01)
*G01N 1/40* (2006.01)
*G01N 1/38* (2006.01)
*G01N 1/44* (2006.01)

(52) U.S. Cl.
CPC ............. *B05D 3/14* (2013.01); *G01N 1/4022* (2013.01); *G01N 1/38* (2013.01); *G01N 1/44* (2013.01); *G01N 2001/4027* (2013.01)

(58) Field of Classification Search
CPC .......................... G01N 2001/4027; B05D 3/14
See application file for complete search history.

(56) References Cited

U.S. PATENT DOCUMENTS

2002/0074342 A1*  6/2002  Shafer .................. B01J 19/0046
                                                                222/56

OTHER PUBLICATIONS

International Search Report—PCT/NL2011/050328—dated Sep. 5, 2011.
Nelson w et al: "An EWOD Droplet Microfluidic Chip with Integrated Local Temperature Control for Multiplex Proteomics", Micro Electro Mechanical Systems, 2009. MEMS 2009. IEEE 22nd International Conference on, IEEE, Piscataway, NJ, USA, Jan. 25, 2009 (Jan. 25, 2009), pp. 280-283, XP031444284, ISBN: 978-1-4244-2977-6.
Wang E N et al: "Droplet mixing using electrically tunable superhydrophobic nanostructured surfaces", Microfluidics and Nanofluidics 2009 Springer Verlag Deu, vol. 7, No. 1, 2009, pp. 137-140, XP002603987, DOI: DOI:10.1007/510404-008-0364-7.

(Continued)

*Primary Examiner* — Joel G Horning
(74) *Attorney, Agent, or Firm* — Banner & Witcoff, Ltd.

(57) ABSTRACT

Method for treating a drop of liquid, including:
placing a drop (D) of liquid on a support surface (S);
applying a time-varying electric field to the drop (D), thus moving a contact line of the drop (D) hence suppressing contact line pinning; and
evaporating at least part of the liquid from the drop (D) during the application of the alternating field.

19 Claims, 5 Drawing Sheets

(56) References Cited

OTHER PUBLICATIONS

Garcia-Sanchez P. et al: "Electrothermally driven flows in ac electrowetting", Physical Review E—Statistical, Nonlinear, and Soft Matter Physics Jan. 27, 2010 American Physical Society USA, vol. 81, No. 1, Jan. 27, 2010 (Jan. 27, 2010), XP002603986, DOI: DOI:10.1103/PHYSREVE.81.015303.

Banpurkar A G et al: "Electrowetting-based microdrop tensiometer", Langmuir Oct. 7, 2008 American Chemical Society US, vol. 24, No. 19, Oct. 7, 2008 (Oct. 7, 2008), pp. 10549-10551, XP002603985, DOI: DOI:10.1021/LA801549P.

Oh J M et al: "Shape oscillation of a drop in ac electrowetting", Langmuir, American Chemical Society, Washington, DC, US LNKD-DOI: 10.1021/LA8007359, val. 24, No. 15, Aug. 5, 2008 (Aug. 5, 2008), pp. 8379-8386, XP002530887, ISSN: 0743-7463 [retrieved on Jun. 27, 2008].

Yuejun Zhao et al: "A micro particle sampler using electrowetting-actuated droplet sweeping", Solid-State Sensors, Actuators and Microsystems, 2885. Digest of Techn Ical Papers. Transducers '05. The 13th International Conference on Seoul, Korea Jun. 5-9, 2805, Piscataway, NJ, USA,IEEE LNKD—DOI:18.1189/SENSOR.2085. 1496376, vol. 1, Jun. 5, 2005 (Jun. 5, 2005), pp. 129-134, XP010827980, ISBN: 978-0-7803-8994-6.

Mugele Fetal: "Microfluidic mixing through electrowetting-induced droplet oscillations", Applied Physics Letters, AIP, American Institute of Physics, Melville, NY, US LNKD—DOI:18.1063/1. 2204831, vol. 88, No. 20, May 18, 2006 (May 18, 2806), pp. 204106-204106, XP012081788, ISSN: 0003-6951.

Crane Nathan et al: "Characterization of electrowetting processes through force measurements", Review of Scientific Instruments, AIP, Melville, NY, US LNKDDOI: 18.1063/1.3373945, vol. 81, No. 4, Apr. 6, 2010 (Apr. 6, 2810), pp. 43902-43982, XP012134960, ISSN: 0034-6748.

Olena Kudina et al.: "e-MALDI: An Electrowetting-Enhanced Drop Drying Method for MALDI Mass Spectrometry," Anal. Chem., 88, pp. 4469-4675, Mar. 30, 2016.

\* cited by examiner

METHOD FOR TREATING A DROP OF LIQUID

CROSS-REFERENCE TO RELATED APPLICATIONS

This application is a U.S. National Stage application under 35 U.S.C. § 371 of International Application PCT/NL2011/050328 (published as WO 2011/145929 A1), filed May 16, 2011, which claims priority to Application EP 10163000.2, filed May 17, 2010. Benefit of the filing date of each of these prior applications is hereby claimed. Each of these prior applications is hereby incorporated by reference in its entirety.

FIELD OF THE INVENTION

The invention relates to a method for treating a drop of liquid.

BACKGROUND

In biology and analytical chemistry, microarrays are widely used in detecting biological macromolecules such as DNA, proteins, antibodies, glucoconjugates and cancer markers. A common approach in detecting macromolecules is the lock-key chemistry where a nano-liter drop of macromolecular soup including target "key" molecule interacts with lock molecules spotted on a substrate. "Lock" molecules selectively bind to the "key" molecules of interest, producing a fluorescence signal.

Spotting and evaporation of drops are essential processes for production of efficient, high quality microarrays. However, the efficiency of aforementioned methods is hampered by so called coffee ring/stain effect. Coffee stain effect is a generic physical phenomenon that occurs whenever a suspension (e.g. a drop consisting of a volatile solvent and a nonvolatile solute) on a surface evaporates on a solid surface ("Capillary flow as the cause of ring stains from dried liquid drops"; Deegan et al., Jul. 15, 1997). The contact line pinning leads to enhanced evaporation in the vicinity the contact line and leaves behind a heterogeneous ring like structure called coffee stain. Quality of spotting is crucial for expanding microarray applications to other fields such as gene regulatory networks, protein-protein interactions where precision and number of samples to be analyzed is more demanding.

For example, a coffee stain effect can be observed in the figures of the publication "A micro particle sampler using electrowetting-actuated droplet sweeping", Zhao et al., pages 129-134, Transducers'05, The 13$^{th}$ International Conference on Solid-State sensors, Actuator and Microsystems, Seoul Korea, Jun. 5-9, 2005. In that publication, droplets are moved over a hydrophobic surface, before their evaporation, for collecting particles therefrom (for the purpose of sampling). According to the publication, a top electrode in the form of a glass plate having a grounding ITO layer—used for transporting the droplets—is removed to enhance the evaporation. The evaporation was only performed to demonstrate that the particles are indeed successfully swept away from the superhydrophobic surface for the purpose of sampling.

Evaporation of droplets can be achieved in various ways. For example, the publication "An EWOD droplet microfluidic chip with integrated local temperature control for multiplex proteomics", Nelson et al., MEMS 2009, MEMS 2009, IEEE 22$^{nd}$ international conference, Piscataway USA, 20 Jan. 2009, pages 280-283, discloses pinning samples utilizing hydrophilic patches, and heating the pinned samples for their evaporation. In this publication, heating is performed by resistive heating. Electrowetting is only used to move the drop onto the resistive plate.

Various methods are known to improve spatial stain homogeneity, as is described in US2007/0170058 (Lee et al.). US'058 propose a device that controls particle distribution using electroosmotic flow at the bottom of the droplet. To that aim, the device comprises a substrate having two electrodes. One of the electrodes is ring-shaped and must extend along the rim of the droplet during operation. The second electrode must be located at the center of the droplet. During operation, DC (direct current) electric field is applied to a droplet using both electrodes, causing radial electroosmotic flow in a bottom part of the droplet. Application of high voltages is avoided since such voltages hampers uniform distribution, according to US'058. A uniform solute deposition can only be obtained when the electric field has a specific strength.

One disadvantage of this method is that the droplet must be accurately positioned with respect to both electrodes. Also, as follows from the experiments mentioned in the publication, setting electrode voltages to the appropriate values for achieving the desired radial flow is relatively cumbersome, and is highly dependent on the electrical characteristics of the constituents of the droplet. Besides, the electroosmotic flow based method relies on direct electric contact with liquid of interest. This poses undesired issues related to bio compatibility. Furthermore, efficiency of such a method strongly relies on properties of solute which varies dramatically for biomolecules. In addition to this, the electrodes are not flexible for miniaturization as microarrays may require hundred thousand spots on a chip. Thus, this method does not provide a "flexible and solid" solution for coffee stain phenomena in bio-microarrays.

The present invention aims to provide an improved method for treating one or more drops of liquid. Particularly, the invention aims to provide a commercially viable method, wherein suppression or reduction of the ring stain effect can be achieved in an efficient, easily controllable manner.

SUMMARY OF THE INVENTION

To this aim, the invention is characterized by the features of claim 1. Particularly, a method for treating a drop of liquid includes:
  placing a drop of (a preferably electrically conductive or highly polarizable) liquid on a support surface;
  applying a time-varying or alternating electric field to the drop for continuously moving, e.g. shaking, a contact line of the drop so as to suppress contact line pinning; and
  evaporating at least part of the liquid from the drop during the application of the alternating field.

Thus, the inventors have found that suppression of pinning of the contact line of the drop results in a very good suppression of the coffee stain effect. It has also been found that the suppression of the contact line pinning by application of the electric field may optionally lead to an induction of a mass flow in the drop that mixes the content of the drop, particularly at relatively low frequencies.

In addition to suppression of dynamic contact angle hystersis that reduces pinning and heterogeneous evaporation and mixing that can counteract the capillary flow; decreasing of static contact angle which favors adhesion of drop on surface, adsorption of solute to surface, and easy high speed spotting are simultaneously achieved. Contrary to the method that is proposed in US2007/0170058, the method according to the present invention can be carried out without having to apply a dedicated DC field nor does it require direct electrical contact between the liquid and the electrodes. Thus, in a preferred mode, the present invention does not use any electroosmotic flow in the droplet.

Also, the present invention does not require accurate radial positioning of a droplet with respect to two electrodes, as is the case when radial electroosmotic flow is to be achieved. Also, the present invention does not require application of an electrode that is located at the centre of the droplet.

Furthermore, the present invention does not require the addition of additional substances to the fluid (such as surfactants or highly volatile solvents) to promote Marangoni flows.

In addition, the present invention does not require hydrophobization of surface where the drop rests. Hydrophobization may for example be effected by silanization or coating of a surface with hydrophobic coatings such as Teflon®. The surface where the drop rests in the invention can be hydrophobic or hydrophilic, as long as it enables contact angle greater than about 60 degrees so as to allow for electrowetting.

Particularly, the present innovative method involves applying the time-varying or alternating electric field to the drop for shaking the drop, without substantially moving a centre of the drop with respect to a support surface. Thus, each drop remains at the same location on the support surface during the application of the electric field to the drop.

It is observed that the afore-mentioned publication "A micro particle sampler using electrowetting-actuated droplet sweeping", Zhao et al., only discloses using electrowetting for moving droplets over a surface, to collect particles from that surface. Application of a time-varying or alternating electric field during evaporation of a droplet is not disclosed in this publication.

In the case of an electrically conductive drop of liquid, the electric field is applied in such a way that it leads to electrowetting of the drop on the support surface, during evaporation, particularly to change a contact angle of the drop with respect to the surface and a motion of the drop. The electric field gives rise to Maxwell stress that pulls on the liquid, so that a very efficient and effective way of preventing the coffee stain effect can be achieved. For drops of non-conductive liquids, the motion of the drop or particles/contents inside the drop is achieved through dielectrophoretic forces.

A further advantage of electrowetting is that the field can be applied using electrodes, in such a manner that no electric current passes the drop.

In one embodiment of the present invention the electric field is a slowly varying amplitude-modulated DC electric field, or a DC and AC electric field, whose generating voltage varies between a minimum and a maximum at a relatively low frequency of typically less than 5 Hz. Such a field allows for the suppression of the coffee stain with predominantly decreasing hystersis and pinning, and with a minimum or no mixing effect.

In a preferred embodiment of the present invention, the electric field is applied using at least one electrode that is electrically isolated from the drop of liquid. In yet a further embodiment, the field is applied using only one or more electrodes that are isolated from the droplet.

According an aspect of the invention, the electric field can be applied such that it achieves a local heating in the droplet, the heating leading to thermal gradients and internal flow inside the droplet.

Also, the invention provides a system configured to carry out the innovative method, the system including:
the support surface;
a drop applicator configured to place at least one drop on the support surface; and
a field applicator configured to apply an electric field to the drop during evaporation of the drop.

Thus, the system can provide the above-mentioned advantages.

In a preferred embodiment, the system is provided with interdigitated electrodes, being electrically isolated from each other, and all being located below the support surface (particularly below a dielectric layer supporting the droplet).

Further advantageous embodiments are described in the dependent claims. The invention will now be further elucidated by means of non-limiting examples, referring to the drawing.

Similar or corresponding features are denoted by similar or corresponding reference signs in the present patent application.

DETAILED DESCRIPTION

Figure 1:
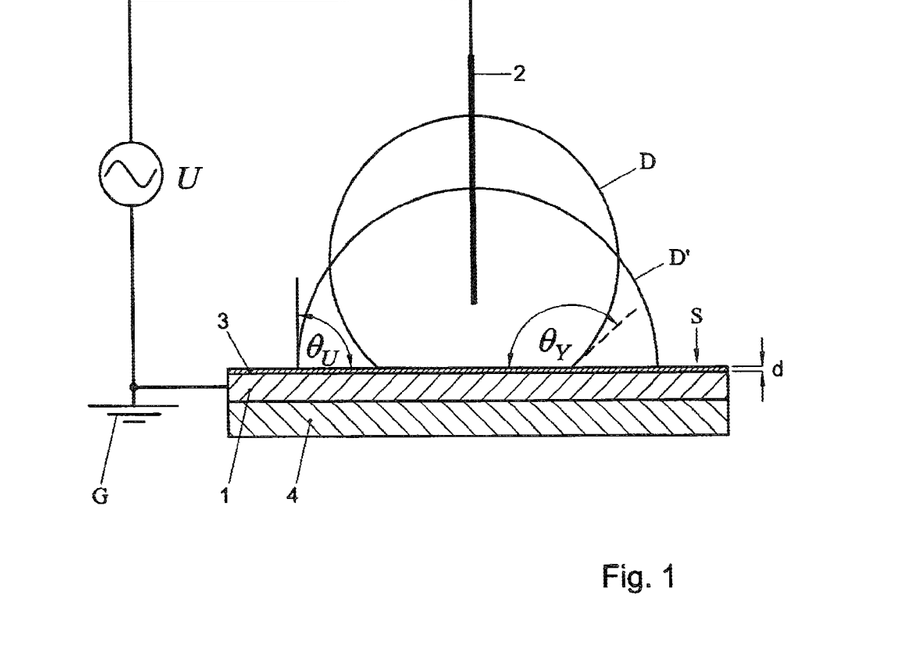
FIG. 1 schematically shows a system and method according to a first embodiment, of the invention, in side view.

FIG. 1 schematically shows a system, including a support surface S for supporting one or more drops D of liquid (only one drop D being shown in the example, the drop being located on a respective drop treatment location on the support surface S). In the present non-limiting example, the support surface S has a 2-dimensionally planar configuration, for example extending horizontally during operation.

The system includes a field applicator, configured to apply an electric field to the drop D (located in a respective treatment site on the surface S) during evaporation of the drop. Particularly, the system is configured to achieve the electrowetting effect during operation, during a period when the drop D at least partly evaporates.

In the first example, the field applicator includes a first electrode 1 that is electrically isolated from the drop D during operation, and a second electrode 2 that is in electrical contact with the drop D. Also, a field generator U is provided configured to apply an alternating electric potential difference between the first electrode 1 and second electrode 2 during operation. In the example, one of the electrodes (in this case the first electrode 1) is grounded, via earth G.

The electrodes 1, 2 as such can be configured in various ways. In the example, the first electrode 1 is spaced-apart from the support surface S, one or more isolating layers 3 extending there-between. Particularly, the layer 3 can be or include a (electrically non-conducting) dielectric layer. In a further embodiment, the layer 3 can be a coating layer that has been coated onto the underlying electrode. In the example, the support surface S can be the external surface of the dielectric layer 3. Preferably but not necessarily, a hydrophilic support surface S is used. In a non-limiting embodiment, the layer 3 defining the support surface is a layer of SU8 photo-resist material (commercially available from MicroChem Corp. of Newton, Mass.—USA), or Teflon®.

In the present example, the dielectric layer 3 has a thickness d (measured in a normal direction with respect to the surface S) that is smaller than an initial thickness of a drop D that is to be treated. For example, the thickness d of the dielectric layer can be smaller than 10 micron, for example smaller than 100 nm, for example smaller than 10 nm, depending on the size of droplets D that are to be treated.

In the example, the dielectric layer 3 separates the first electrode 1 from the support surface S. The first electrode 1 can be a layer of a conducting material, for example Indium Tin Oxide (ITO), for example a metal layer (the metal for example being an inert metal, for example gold or platinum), or another type of metal). In the example, the first electrode 1 is placed on, or embedded in, a substrate 4 (for example a glass substrate). Particularly, the first electrode is a planar electrode 1 extending below the support surface S, the electrode being configured to extend below a drop D during use, and having a width (measured in parallel with respect to the support surface S) that is larger than a width of each drop that is to be treated (as in FIG. 1).

The second electrode 2 of the first example is an electrically conducting needle or wire, making electrical contact with the drop D during operation by reaching into the drop D (via an upper surface of the drop D). Preferably, this second electrode 2 is spaced-apart from the support surface S.

Figure 2:
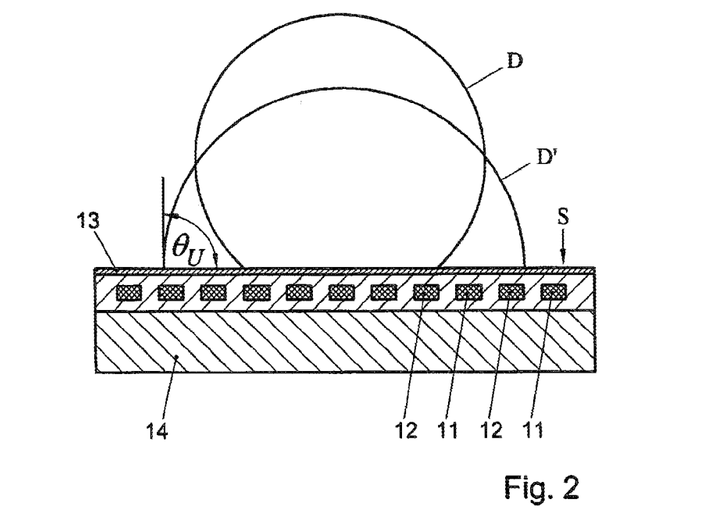
FIG. 2 schematically shows a system and method according to a second embodiment, of the invention, in side view.
Figure 3:
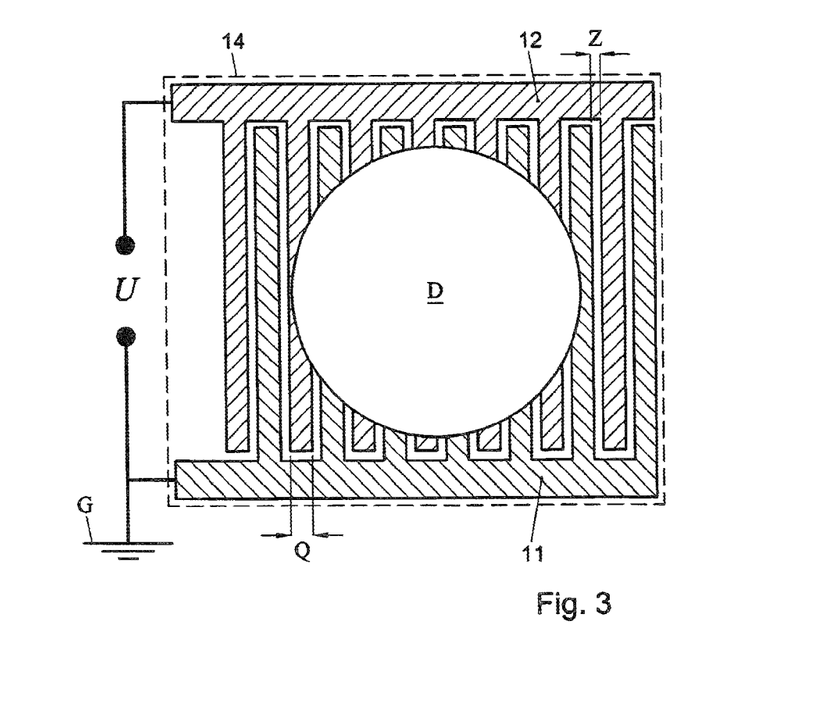
FIG. 3 is a top view of the second embodiment shown in FIG. 2.

FIGS. 2-3 (described below) show a further advantageous configuration, wherein the second electrode is also located below the support surface S. Here, the electrodes are made by patterning the conducting material on the substrate using photolithographic technique. In yet another, third embodiment, shown in side view in FIG. 4 and in top view in FIG. 5, the system can include a first electrode 1 disposed below surface S, and a second electrode 2 disposed, e.g. deposited, on the surface S to obtain the electrowetting effect during operation.

Preferably, the system includes a drop applicator K (depicted schematically in FIG. 1) configured to place at least one drop D on the support surface S. Particularly, the drop applicator K can place the at least one drop D on at least one predetermined treatment site, to be evaporated on that site. The drop applicator K can be configured in various ways, as will be appreciated by the skilled person. For example, the drop applicator K can be a printing head, configured to apply one or more drops D onto the surface S using a printing method (such as inkjet printing or contact printing). For example, the drop applicator K can be configured to apply a 1-dimensional or 2-dimensional pattern of drops D onto the surface S.

A drop of liquid D that is placed on the support surface S can have various dimensions. For example, an initial volume of the drop D can be smaller than 10 microliter. According to a preferred embodiment, the initial volume of each drop D is smaller than 100 nanoliter, for example smaller than 10 nanoliter, for example about 1 nanoliter or smaller.

The drop of liquid D can have various compositions. In the present examples, the drop D is preferably electrically conductive. For example, the drop D can be a liquid (for example water or another liquid) that is to be at least partly evaporated, containing one or more particles, substances, molecules or the like that are to be purified, separated, detected and/or analysed.

For example, the drop of liquid can contain at least one constituent which is to be detected after the evaporation of at least part of the liquid from the drop D. Also, in an embodiment, the drop D can contain fluid emanating from a living species. The drop D can be or contain a bimolecular solute, for example, biological macromolecules, such as DNA, proteins, antibodies, glucoconjugates, and cancer markers, and/or other constituents.

The drop can include one or more polymers, one or more organic substances, one or more inorganic substances, one or more metals, or one or more biomolecules. Also, for example, solute particles in the drop D can be neutral, negatively charged or positively charged.

Besides, in an embodiment, the drop D of liquid can contain at least one constituent which crystallizes as a result of the evaporation of the liquid from the drop D. For example, the system can be used to generate crystals from evaporating liquid. As an example, the drop D can contain at least one component that is to be crystallized, the component being selected from colloidal particles, metals, and quantum dots.

In a further embodiment, the system can be provided with a detector H (depicted schematically) configured to detect a residue of at least one (at least partly) evaporated drop D. The detector H can be configured in many different ways, for example depending on a substance that is to be detected, as will be appreciated by the skilled person.

In a further embodiment, the support surface S can be provided with binding molecules (i.e. "key molecules") the binding molecules being suitable to bind to certain (i.e. "lock") drop particles or constituents to be detected and/or determined. For example, such binding molecules can be provided in a 2-dimensional or 3-dimensional pattern on the support surface S. In a further embodiment, the binding molecules can selectively bind to certain "key" molecules of interest, producing a fluorescence signal.

For example, at least one of said binding molecules can be a specific binding molecule suitable to bind to certain particles to be detected, for example a member of a specific binding pair such as an antibody and/or its antigen or a receptor and/or its ligand. Besides, at least one of said specific binding molecules can be an antibody or a functional part, derivative and/or analogue thereof. Moreover, said functional part can be an antigen binding part of an antibody, for example a Fab-fragment. Further, wherein said functional derivative can be a single chain variable fragment (ScFv) or a monobody. In an aspect of the invention, said analogue can be a binding body comprising at least one Ig-like fold of a non-antibody protein or a functional equivalent thereof. Also, a mixture of DNA fragments can be detected, and a specific ssDNA strands can be immobilised on the support surface S uniformly without having coffee stain effect. Besides, the binding molecules may be suitable to detect Polymerase chain reaction products. For example, first fragments can be separated on basepair length and at a detection area on the specific hybridisation on the fragments. For example, both receptor, ssDNA, ligands can be immobilized on the support surface S.

Then, for example, the detector H can be configured to detect whether certain drop particles and certain binding molecules are bound to each other. Fluorescence detector/microscopy, mass spectrometry, laser technology and/or digital imaging technology, and/or other methods, can be utilized, depending amongst others on the particles to be detected and/or analyzed.

Optionally, the system can include an evaporation enhancer or inhibitor, for example a heating/cooling device and/or a gas flow inducer, configured to enhance/inhibit evaporation of a drop D that is located on the support surface S. Cooling may for example be required in biological applications involving proteins.

During operation, the system can carry out a method for treating the drop D of liquid, after the drop D has been placed on the electrically isolating (dielectric) support surface S. As follows from the drawings, the drop D can be placed at a certain predetermined, fixed, drop treatment location on the surface. Then, the field generator U, 1, 2 is activated to apply an alternating electric field to the drop D, thereby mobilizing the triple contact line of the droplet to avoid pinning and possibly inducing a mass flow throughout the drop D which also mixes the content of the drop D. From the drawing it also follows that the drop D can remain at the same location (i.e. said treatment location) during the application of the field. Thus, the field is not used for transporting the drop along the support surface to another location.

At least part of the liquid is being evaporated from the drop D during the application of the field. For example, at least 50% of the liquid of the drop D can be evaporated during the application of the field. Alternatively, the drop D can be substantially dried (i.e. the liquid is fully evaporated) during the application of the field.

In the present example, the electric field is applied to effect electrowetting of the drop on the (preferably dielectric) support surface S, leading to a changing contact angle of the drop D with respect to the surface S, and a change of the shape of the drop (the changed shape has been indicated by dome D' in FIG. 1). In other words: the field is applied for charging and discharging an electric capacitor, the drop D as such forming part of the capacitor In a further embodiment, the electric field is applied such that the contact angle of the drop D on the surface S periodically varies, and the drop expands and contracts. The content of the drop D can be mixed, particularly by hydrodynamically driven flows within the drop, the flows resulting from drop expansion and contraction.

The concept of electrowetting as such is known, see the publication ("Electrowetting: from basics to applications, F. Mugele et al, J, Phys. Condens. Matter, 2005, 17, R705-R774), incorporated herein by reference in its entirety. Particularly, the following equation applies (see FIG. 1 as well):

$$\cos\theta(U) = \cos(\theta_Y) + \frac{\varepsilon_0 \varepsilon U^2}{2\gamma d} \quad (1)$$

Wherein $\theta_Y$ is the drop's initial contact angle with the surface, $\theta(U)$ is the contact angles as a result of the electowetting effect, $\varepsilon_0$ is the permittivity of vacuum, $\varepsilon$ and d are the dielectric constant and thickness of the dielectric layer 3 and $\gamma$ is the interface tension.

Advantageously, in the present method, the electric field is varied to induce mobilization contact line of the drop D during its evaporation, the mobilized contact line leads to low contact angle hystersis and hence the pinning of the droplet is dramatically decreased. Also preferentially but not necessarily internal mass transport occurs that mixes the content of the droplet D. Also decreasing of static contact angle which favors adhesion of drop on surface and adsorption of solute (particle or molecule) to surface, and easy high speed spotting occurs simultaneously.

Particularly, the oscillations can be self-excited oscillations. The droplet D may periodically detach from the second electrode 2 during operation, however, that is not essential.

Preferably, the field is applied such that said contact angle decreases from an initial angle $\theta(U)$ with at least 10 degrees, for example at least 25 degrees, and particularly at least 150 degrees, to the angle $\theta_Y$.

Also, for example, good results are achieved in case the field is being applied such that the contact angle $\theta_Y$ is smaller than 90 degrees, preferably smaller than 80 degrees, during application of the field. For example, said contact angle $\theta_Y$ can be about 70 degrees or smaller, for example about 10 degrees during application of the field.

Also, for example, various field variation waveforms (of field amplitude versus time) can be used, for example sinus waves, block waves, sawtooth waves, a pulsed field (including a train of pulses), and/or other waveforms.

As follows from the drawing, the electric field can be varied to induce displacement of a top of the drop D in a direction normal with respect to the support surface S. Besides, the drop D experiences a continuously expanding and retracting drop diameter during the alternating field induced motion.

Also, particularly, the field is applied using the electrodes 1, 2, in such a manner that no direct current can pass the drop D, due to the application of the electric isolating layer 3. Further, during operation of the first embodiment, the field is applied using a first electrode 1 that is located below the support surface S, spaced-apart from the drop D, the second electrode 2 being in contact with the drop D.

It has been found that good results can be achieved in case the electric field has a frequency in the range of 0.01 Hz to 500 kHz, particularly 100-10000 Hz, for example (but not limited to) about 1 kHz. Also, it has been found that good electrowetting and coffee ring suppression results can be achieved in case of amplitude (i.e. maximum potential difference) of the alternating electric field is larger than 5 Volt, and preferably larger than 10 Volt. For example, during operation, the field can achieve a maximum potential difference in the range of 10-1000 Volt, for example (but not limited to), about 100 Volt.

Also, advantageously, the present method can lead to a significant suppression of contact angle hystersis (i.e. to a relatively small difference between advancing and receding contact angle), avoiding that the drop D gets stuck as the drop evaporates. Shaking the contact line by a slowly varying DC (direct current) voltage can also suppress the contact angle hystersis hence coffee stain effect. Such an embodiment allows minimum mixing effect while the major cause of coffee ring suppression is due to decreasing of contact angle hystersis. In this case the DC voltage is ramped between a high and low voltage at a low frequency, typically <5 Hz. The electric field can also be an amplitude modulated AC field.

A result of the method can be a residue of a drop of liquid, the residue for example having a relatively homogeneous composition.

Figure 6:
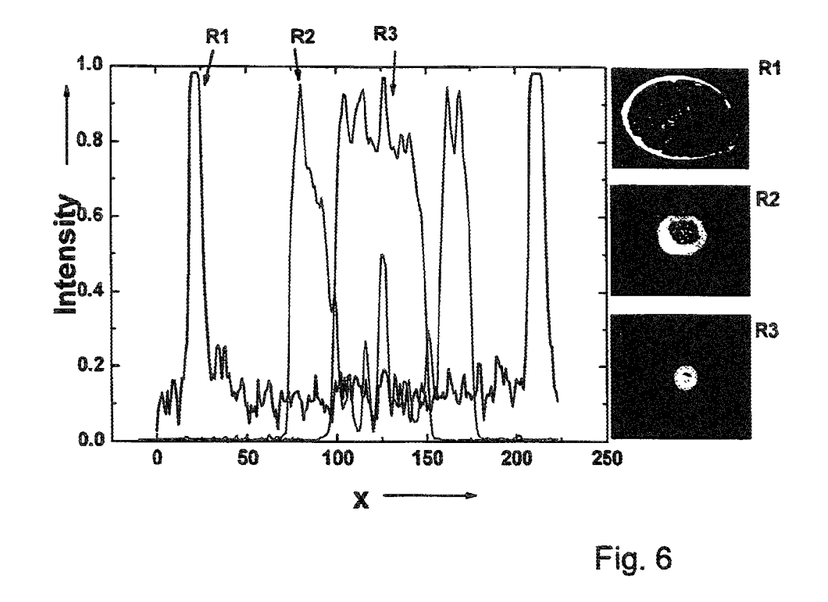
FIG. 6 shows graphs of experimental results of the method according to the invention where the whole coffee stain is observed with low magnification, the evaporated fluid being a colloidal suspension.

FIG. 6 shows some experimental results of the invention, illustrating that the coffee stain formed by the colloidal particles can be partially or fully suppressed. FIG. 6 is a diagram of detected residue (detector intensity) versus horizontal distance X on the support surface (measured along the midpoint of the final residue, in arbitrary units) where the whole of remaining residue is imaged by low magnification. A first graph R1 in the diagram of FIG. 6 is the result of evaporating a drop, without application of the present invention, leading to a coffee stain/ring at X~350. A second graph R2 is the result of evaporating a drop wherein the method according to the invention was applied during only part of the evaporation period. This resulted in a significant reduction of the size of the ring stain. A third graph R3 is the result of evaporating a drop wherein the method according to the invention was applied throughout the evaporation period, resulting in a full suppression of the coffee stain effect, and a desired relatively constant detector intensity for the remaining residue. Suppression of coffee stain can be thus controlled to desired extent from a fully developed coffee stain to a single spot when treated with the method of this invention.

Figure 7:
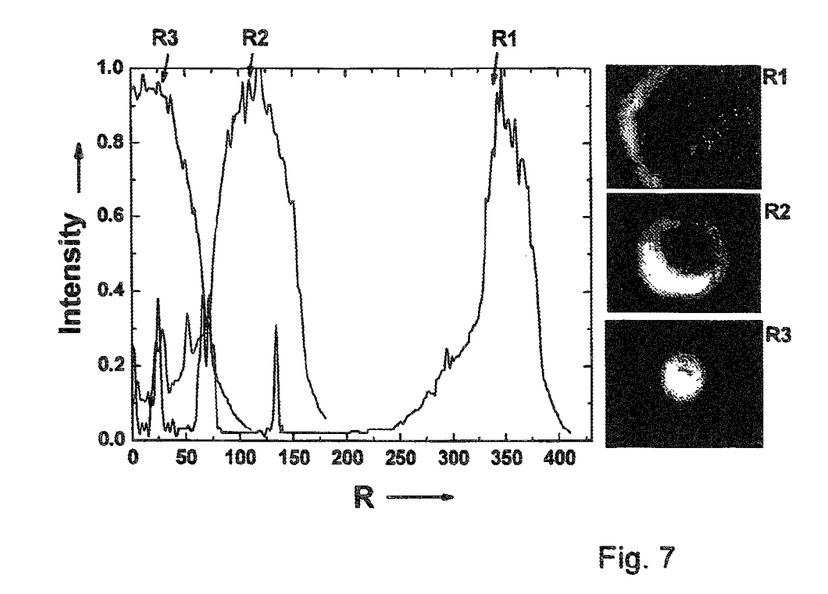
FIG. 7 shows graphs of the same experimental results as FIG. 6 but with higher magnification.

FIG. 7 is a graph of detected residue (detector intensity) versus radial distance R on the support surface (measured from the centre of the initial droplet that was evaporated, in arbitrary units) where the residue is imaged with high magnification. Residues (R1, R2, R3) used to construct FIG. 7 are higher magnification images of residues used to construct FIG. 6.

Figure 8:
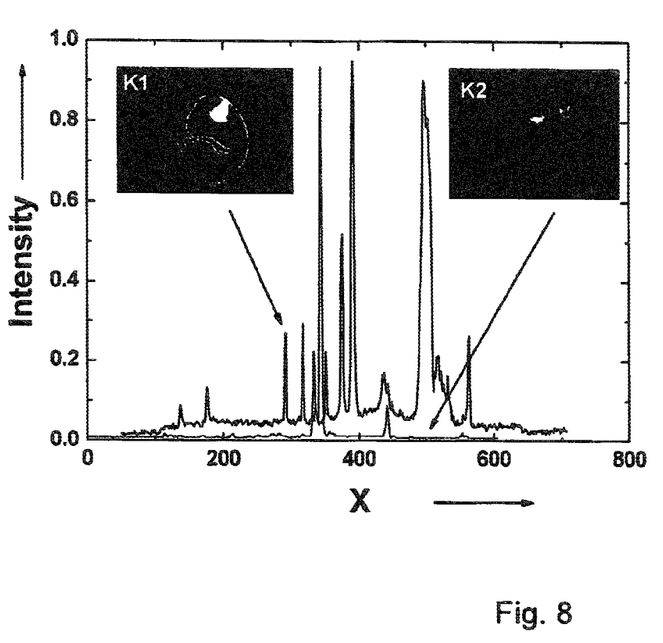
FIG. 8 shows graphs of experimental results of the method according to the invention, the evaporated fluid being fluorescently labelled λ-phage DNA.

FIG. 8 shows experimental results of the invention where the evaporating liquid contained fluorescently labelled λ phage DNA. Upon application of the invention coffee stain observed in evaporation is completely suppressed compared to a case where invention is not applied.

FIG. 8 is a diagram of detected residue (detector intensity) versus horizontal distance X on the support surface (measured from the centre of the initial droplet that was evaporated, in arbitrary units). A first graph K1 of the diagram is the result of evaporating a drop, without application of the present invention, leading to several small coffee stain/ring at various positions and a final strongly pronounced ring at X=400-500. A second graph K2 is the result of evaporating a drop wherein the method according to the invention was applied, resulting in a full suppression of the coffee stain effect, and a desired relatively constant detector intensity for the remaining residue of fluorescently labelled DNA.

Thus, the coffee stain effect can be eliminated completely via electrowetting, for example to improve detection efficiency in Micro-arrays methods. Furthermore, it has been found that an efficient mixing can be ensured, simultaneously with homogeneous spotting.

The present method can be substantially independent of a charge, pH or even the chemical composition of a solute that is to be treated. This opens up the possibilities for automation of microarray technologies.

FIGS. 2-3 show a further advantageous embodiment of a system according to the invention. The second embodiment differs from the embodiment of FIG. 1 in that the second electrode 12 of the field applicator is also located below the support surface S. In this example, the first electrode 11 and second electrode 12 are interdigitated electrodes 11, 12, being electrically isolated from each other, and located at the same level below the support surface S. For example, both electrodes 11, 12 can be embedded in a substrate 14. As in the first example, the system also includes a dielectric layer 13, which preferably defines the support surface S.

The interdigitated electrodes 11, 12 can be configured in various ways. Preferably, each of the electrodes 11, 12 is provided with a grid or pattern (in the example an array, see FIG. 3) of elongated electrode sections of relatively small transversal dimensions, the elongated sections of the two electrodes 11, 12 for example extending in parallel and alternating with one another when viewed in top view (see FIG. 3), and being mutually separated by a small distances Z. Small strips of electrically isolating material (for example a substrate material) extend between opposite sides of the first electrode 11 and the second electrode 12.

For example the elongated electrode sections of each electrode 11, 12 can have a width Q (measured in parallel with the support surface S) that is smaller than an initial diameter of a drop D that is to be treated (see FIG. 3). For example, said width Q can be at least five times smaller than an initial diameter of a drop D. In a further example, the transversal width Q can be smaller than 100 micron, for example smaller than 100 nm, for example smaller than 10 nm, depending on the size of droplets D that are to be treated.

Similarly, a spacing between two neighbouring sections of each electrode 11, 12 (i.e. an interelectrode distance) can have a width Z (measured in parallel with the support surface S) that is smaller than an initial diameter of a drop D that is to be treated (see FIG. 3). For example, said interelectrode spacing Z can be at least five times smaller than an initial diameter of a drop D. In a further example, the transversal spacing Z can be smaller than 100 micron, for example smaller than 100 nm, for example smaller than 10 nm, depending on the size of droplets D that are to be treated.

Also, a length (measured in parallel with the support surface S) of each elongated electrode section (of each electrode 11, 12) can be larger than an initial diameter of a drop D that is to be treated see FIG. 3. For example, said length can be at least five times larger than the initial diameter of the drop D. In a further example, the length of each elongated electrode section can larger than 1 mm, for about 1 cm or larger.

Also, as follows from the drawing, the overall width of the electrode system 11, 12 is larger than a width of a drop that is to be treated.

Operation of the embodiment shown in FIGS. 2-3 is the same as the operation of the embodiment shown in FIG. 1. A difference is that the alternating electric field is applied without electrically contacting the drop D by any of the electrodes 11, 12. Thus, the drop D to be treated can simply be placed on the support surface S, without requiring specific further positioning steps to position an electrode into the drop D.

Figure 4:
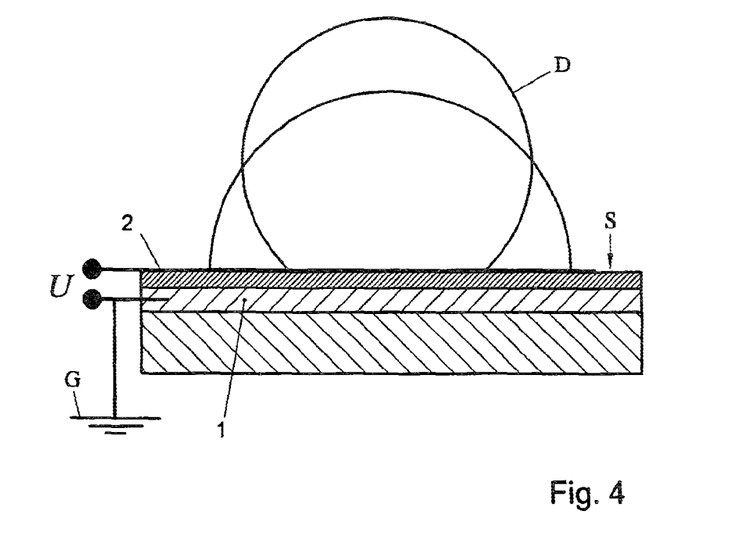
FIG. 4 schematically shows a system and a method according to a third embodiment of the invention in a side view.
Figure 5:
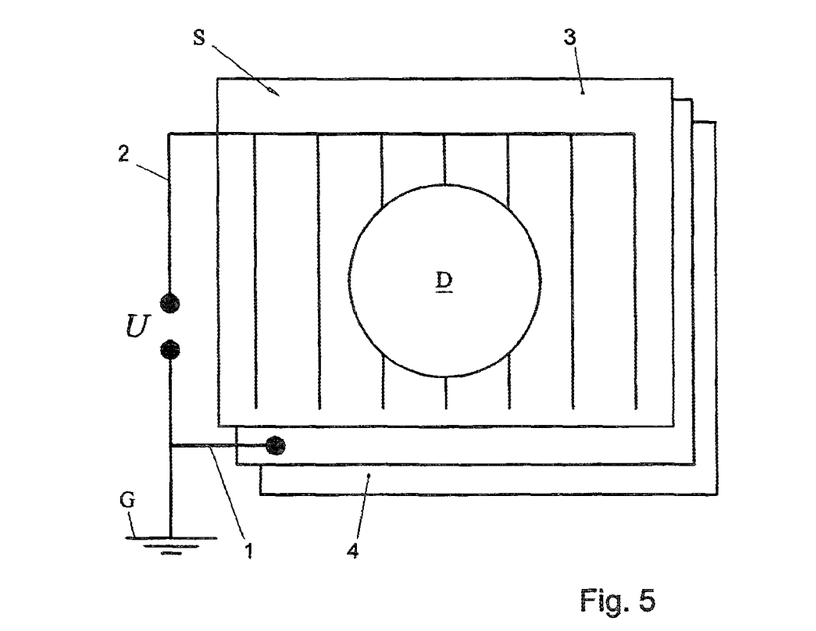
FIG. 5 is a top view of the third embodiment, shown in FIG. 4.

Operation of the embodiment shown in FIGS. 4 and 5 is the same as that of FIG. 1. But here the electrode 2 is deposited/placed on top of the surface S and is in contact with the drop. The width of the electrode can be in micrometers or in nanometers. Dividing the electrode to an array of stripes makes sure that the droplet always touches at least one of the electrodes. Thus, the drop D to be treated can simply be placed on the support surface S, without requiring specific further positioning steps to position an electrode into the drop D In the above examples, the application of fields to provide an electrowetting drop mixing effect at relatively low frequencies has been described. According to another basic idea of the invention, the field is applied such that it achieves a local heating in the droplet, the heating leading to internal mixing. To that aim, it has been found that good results are obtained in case of application of at least one second electrode electrically contacting the droplet in combination with high alternating field frequencies. For example, the embodiment shown in FIG. 1 can be operated with a frequency higher than 20 kHz, for example about 100 kHz or higher. As a result, strong electric fields can be induced by the electrode 2 inside the drop D, leading to a local Joule heating, leading to mixing by electrothermally driven flows. This flow effect is known as such from the publication "Electrothermally driven flows in ac electrowetting", by P. Garcia_Sanchez et al., Physical Review E81, 1(R) 2010, incorporated herein by reference in its entirety. Particularly, the publication shows that at the higher frequencies, the electric field in the liquid bulk becomes important, leading to energy dissipation due to Joule heating and a temperature increase of several degrees Celsius, and that the fluid flow in the drop D at these frequencies is generated by electrothermal effect. An aspect of the present invention utilizes this to advantage during evaporation of the drop D, providing above-mentioned desired suppression of the coffee stain effect.

In the foregoing specification, the invention has been described with reference to specific examples of embodiments of the invention. It will, however, be evident that various modifications and changes may be made therein without departing from the broader spirit and scope of the invention as set forth in the appended claims.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

For example, the present method is not limited by biomolecules solutes such as organic and inorganic colloidal particles, metals, quantum dots can be manipulated by the method and system. For example, the invention can be applied to produce colloidal photonic crystals (using an initial drop D containing colloidal particles).

The invention claimed is:

1. A method for treating a drop of liquid, including:
   placing a drop of liquid on a support surface;
   applying an alternating electric field to the drop, thus moving a contact line of the drop hence suppressing contact line pinning; and
   evaporating at least part of the liquid from the drop during the application of the alternating field, with the drop particularly remaining on a respective fixed treatment location on the support surface during the evaporation and respective field application.

2. The method according to claim 1, wherein the electric field is applied to effect electrowetting of the drop on the support surface, particularly to change a contact angle of the drop with respect to the surface.

3. The method according to claim 1, wherein at least 50% of the liquid of the drop is being evaporated during the application of the field.

4. The method according to claim 1, wherein the electric field is varied to induce oscillations of the drop, and more in particular to mobilize a triple contact line thereof.

5. The method according to claim 1, wherein the field is applied using electrodes, in such a manner that no electric current passes the drop.

6. The method according to claim 1, wherein the field is applied using at least one electrode that is not in electric contact with the drop.

7. The method according to claim 1, wherein an electrically isolating support surface is used for supporting the drop.

8. The method according to claim 1, the field being applied for charging and discharging an electric capacitor, the drop forming part of the capacitor.

9. The method according to claim 1, wherein the electric field has a frequency in the range of 0.01 Hz to 500 kHz.

10. The method according to claim 1, wherein an electric field is applied, achieving a maximum potential difference in the range of 1-1000 Volts.

11. The method according to claim 1, wherein an initial volume of the drop is in the range of 10 nanoliters to 10 microliters.

12. The method of claim 1, wherein the drop of liquid is placed on a support surface with a printing head.

13. The method of claim 12, wherein the printing head is configured to apply a 1-dimensional or a 2-dimensional pattern of drops, to be treated, onto the support surface.

14. The method of claim 1, wherein the support surface is a hydrophilic support surface.

15. The method of claim 1, wherein the alternating electric field is applied using an interdigitated electrode system, including an array of elongated electrode sections, wherein a length, measured in parallel with the support surface, of each elongated electrode section of each electrode is larger than an initial diameter of the drop to be treated, and wherein the overall width of the electrode system is larger than a width of the drop to be treated.

16. The method of claim 15, wherein the alternating electric field has an amplitude of greater than 10 volts.

17. The method of claim 1, wherein a drop applicator places the drop to be treated onto a predetermined treatment location, after which a field generator is activated to apply the alternating electric field to the drop, thereby mobilizing a triple contact line of the drop to avoid pinning, wherein the drop remains at the treatment location during the application of the field, wherein at least 50% of the liquid of the drop is evaporated during the application of the field.

18. The method of claim 1, wherein the alternating electric field has an amplitude of greater than 5 volts.

19. A system configured to carry out the method according to claim 1, the system including:
   the support surface for carrying at least one drop on a respective treatment location;
   a drop applicator configured to place the at least one drop on the support surface; and
   a field applicator configured to apply the alternating electric field to the drop, located on said treatment location, during evaporation of the drop;
   wherein the drop applicator is a printing head, configured to apply one or more drops onto the surface using a printing method and
   wherein the drop applicator is preferably configured to apply a 1-dimensional or a 2-dimensional pattern of drops, to be treated, onto the support surface.

* * * * *